United States Patent
Bierma

(10) Patent No.: US 6,386,552 B1
(45) Date of Patent: May 14, 2002

(54) TWO-WHEEL HAND TRUCK

(76) Inventor: Jochum Bierma, Schablederweg 54, Linz (AT), A-4040

( * ) Notice: Subject to any disclaimer, the term of this patent is extended or adjusted under 35 U.S.C. 154(b) by 0 days.

(21) Appl. No.: 09/763,797

(22) PCT Filed: Jul. 28, 1999

(86) PCT No.: PCT/AT99/00189

§ 371 Date: Feb. 27, 2001

§ 102(e) Date: Feb. 27, 2001

(87) PCT Pub. No.: WO00/12371

PCT Pub. Date: Mar. 9, 2000

(30) Foreign Application Priority Data

Sep. 1, 1998 (AT) ............................................. 1482/98

(51) Int. Cl.⁷ ................................................. B62B 5/02
(52) U.S. Cl. ......................... 280/5.28; 280/5.2; 180/8.2
(58) Field of Search .............................. 280/5.28, 5.3, 280/5.32, 5.2, 5.26; 180/8.2, 8.1, 8.3, 8.5, 8.6; 414/444, 490

(56) References Cited

U.S. PATENT DOCUMENTS

| | | | | | |
|---|---|---|---|---|---|
| 2,641,325 A | * | 6/1950 | Hoffman et al. | ................ | 180/8 |
| 3,788,413 A | * | 1/1974 | Miller | ........................... | 180/8 |
| 4,550,924 A | * | 11/1985 | Alber | ......................... | 280/5.28 |
| 5,141,240 A | * | 8/1992 | Heilig | ......................... | 280/5.3 |
| 5,195,762 A | * | 3/1993 | Pressly | ....................... | 280/5.28 |
| 6,164,398 A | * | 12/2000 | Alber | ......................... | 180/8.2 |

FOREIGN PATENT DOCUMENTS

| | | | | |
|---|---|---|---|---|
| DE | 322 926 | | 7/1920 | |
| DE | 195 19 109 | | 11/1996 | |
| DE | 19519109 | * | 11/1996 | ................ 280/5.28 |
| EP | 0 533 650 | | 12/1994 | |

* cited by examiner

*Primary Examiner*—Anne Marie Boehler
*Assistant Examiner*—Tony Winner
(74) *Attorney, Agent, or Firm*—Collard & Roe, P.C.

(57) ABSTRACT

A sack trolley (1) comprises a support frame (2) presenting a lower pair of carrying wheels (4) and a hoist mechanism (6) for climbing steps, which comprises a lifting arm (10) equipped with support rollers at its free end and which can be swivelled about a swivelling axis (S) parallel to the carrying wheel axis (L) by means of a crank drive (8). In order to achieve step-climbing assistance which is simple, space-saving, easy to handle and functionally safe, the lifting arm (10) is comprised of a swing guide component (11) swivel-mounted about the swivel axis (S) and a support component (12) taking up the support rollers (13) and longitudinally displaceable compared to the swivel guide component (11), whereby the crank drive (8) is articulated on the support component (12) with its crank arm (9).

4 Claims, 4 Drawing Sheets

TWO-WHEEL HAND TRUCK

CROSS REFERENCE TO RELATED APPLICATIONS

Applicant claims priority under 35 U.S.C. §119 of AUSTRIAN Application No. A 1482/98 filed on Sep. 1, 1998. Applicant also claims priority under 35 U.S.C. §120 of PCT/AT99/00189, filed on Jul. 28, 1999. The international application under PCT article 21(2) was not published in English.

TECHNICAL FIELD

The present invention relates to a sack trolley having a support frame presenting a lower pair of carrying wheels and upper handles and a hoist mechanism for climbing steps, which comprises a lifting arm equipped with return rollers at its free end and which can be swivelled about a swivelling axis parallel to the carrying wheel axis by means of a crank drive.

PRIOR ART

A similar sack trolley is disclosed in EP 0 533 650 B and its hoist mechanism for climbing steps has thoroughly proven itself, whereby the lifting arm designated as support frame engages in a crank guide solid with the support frame by way of a guide member in its longitudinal central region, and its end averted from the free end with the return roller is articulated on the crank arm of the crank drive. Because of the cooperation of support frame, crank drive and crank guide the support wheels describe a stilt movement reaching forwards or backwards with switching on, off and reversing of the drive motor, by means of which the support frame, is lifted as it travels up over the steps with the carrying wheels over the support wheels now resting on the ground and the support frame is transferred to the next highest step, or as it travels backwards the support wheels grip downwards on the next lowest step and as a result lower the support frame with the carrying wheels. This hoist mechanism thus requires considerable structural expense and is also associated with a corresponding space requirement which impairs the handiness of the sack trolley and undesirably increases its tare weight. Further to this, because the centre of gravity is misplaced upwards due to the hoist mechanism there is less stable handling of the trolley as it climbs steps, and not least of all in tricky situations the result is unsafe climbing assistance adapted minimally to the step profiles of the step due to the stilt movements of the support wheels.

DESCRIPTION OF THE INVENTION

The object of the invention is therefore to create a sack trolley of the type mentioned at the outset, which is distinguished by its easily handled and functional hoist mechanism with a simple and compact structure.

The invention solves this task in that the lifting arm is comprised of a swing guide component swivel-mounted about the swivel axis and a support component taking up the support rollers and longitudinally displaceable compared to the swivel guide component, whereby the crank drive is articulated on the support component with its crank arm. The free end of the support component is moved on the one hand by the superposition of the swivel movement of the swivel guide component effective thereon and the rotary movement of the crank arm on the other hand along an approximately reinform curved path, resulting in trouble-free climbing assistance according to the direction of movement with the support component and its support rollers. When the sack trolley is in a position corresponding to the travel position the support rollers of the support component are set engagingly on the next highest step tread for travelling up a step, are supported there and raise the trolley from one step to the other. On the contrary, during descent the support rollers remain supported on the respective upper step and the trolley is lowered by way of the lifting arm to the next lowest step, giving rise to a simple and functionally safe raising and lowering movement for automatic step travel. The lifting arm with the crank drive can be accommodated without difficulty in narrow spaces, for example between the carrying wheels of the sack trolley, and thereby alters the centre of gravity position of the sack trolley only insignificantly, in addition to which the hoist mechanism does not weigh excessively because of its simple structure and barely increases the tare weight of the trolley noticeably. The path of motion of the support rollers is influenced by appropriate adaptation of the crank throw, axle position, lifting arm length, articulation point of the crank throw on the support component and the like and is adapted to different step profiles, whereby the passage speeds of the path of the support rollers are adapted to the respective functional areas and the empty run and vertex areas are passed through more quickly than the lifting or lowering areas required for climbing steps.

A path of motion for the support rollers best adapted to normal use with climbing steps occurs when the crank axis lies in the direction of the support frame above the swivel axis, whereby the crank axis preferably lies above and the swivel axis lies below the swivel carrying wheel axis, and whereby the distance of the crank axis from-the support frame is preferably greater than that of the swivel axis, and the distance of the carrying wheel axis from the support frame is greater than that of the crank axis.

To facilitate assembly of the hoist mechanism and also to be able to subsequently alter the curved path for the support rollers the hoist mechanism plus the crank drive and lifting arm are designed as assembly unit and attached displaceably to the support frame, such that the assembly unit can be mounted problem-free with few hand grips and can be adjusted in place, leading to change in position of the swivel and crank axes and thus to relative displacement of the curved path of the support rollers.

It is particularly advantageous if the support rollers of the support component are equipped with a combined freewheel and brake device which releases rotating of the support rollers in terms of the trolley travelling backwards, but which brakes counter-rotation of the support rollers. Release of the rotary movement of the support rollers in one direction and their braking instead of blocking in the counter-rotation direction facilitates climbing steps with the assistance of the hoist mechanism, since the position of the support rollers on the steps can be corrected effortlessly by the driver of the trolley without losing the necessary support effect of the support rollers.

BRIEF DESCRIPTION OF THE DRAWINGS

The inventive object is illustrated purely schematically in the diagram with reference to an embodiment, in which.

METHOD FOR CARRYING OUT THE INVENTION

Figure 1:
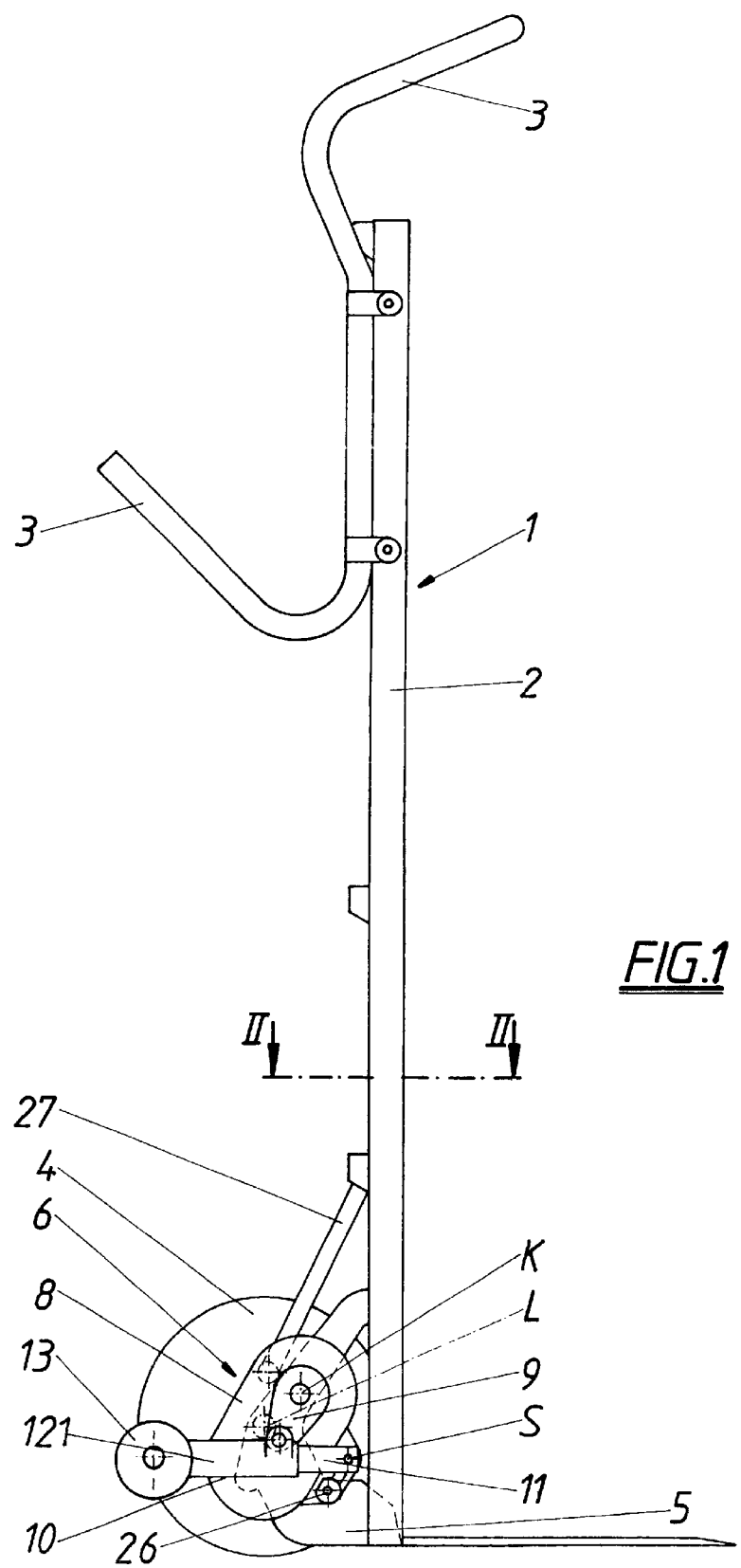
FIG. 1 shows a sack trolley according to the present invention in side view, whereby the front carrying wheel has been omitted for the sake of clarity.
Figure 2:
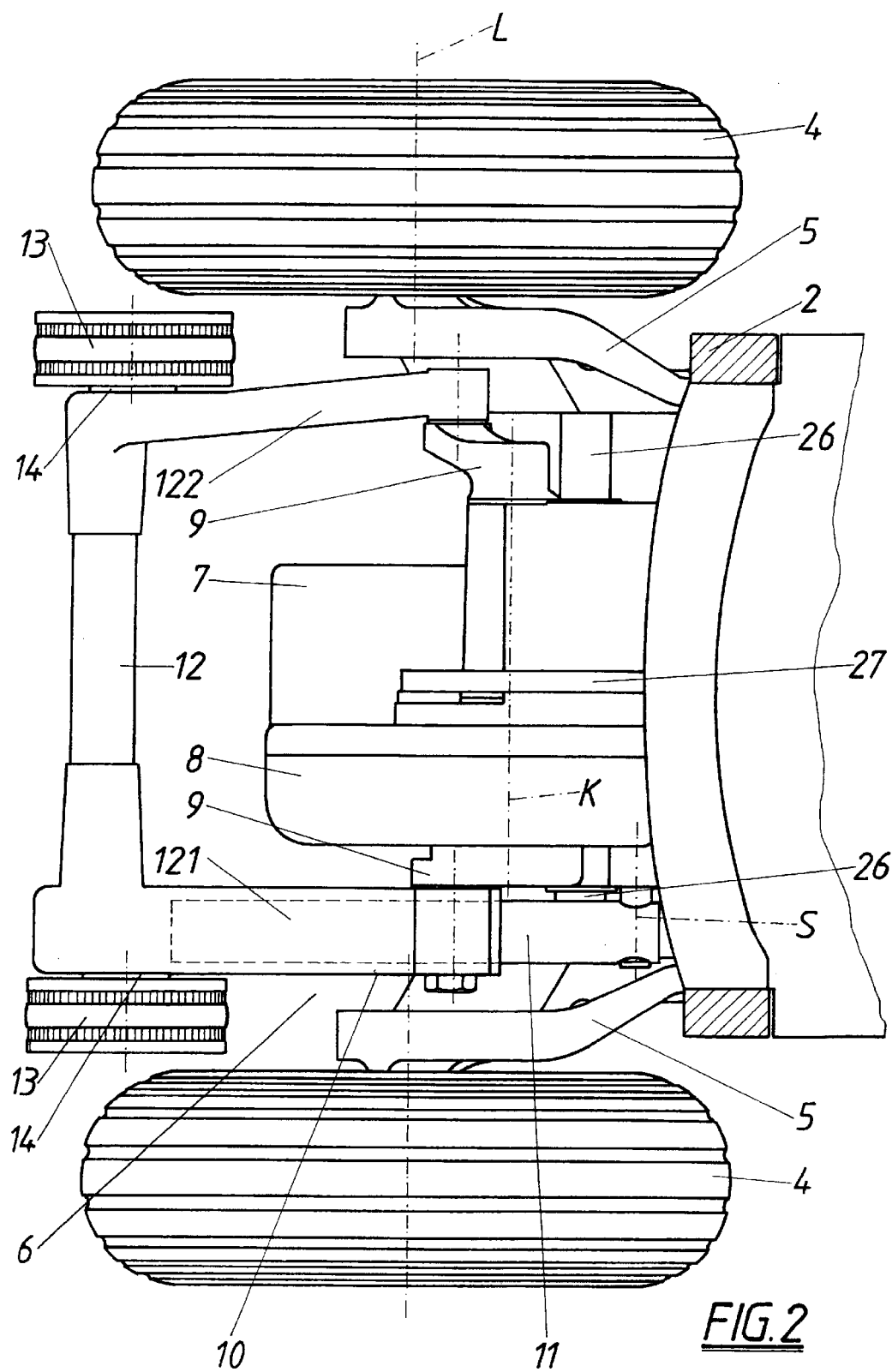
FIG. 2 shows a cross-section along line II-II of FIG. 1 on an enlarged scale.

A step-climbing sack trolley 1 comprises a support frame 2 which exhibits upper hand grips 3 for handling and lower carrying wheels 4 for ground support. Carrying wheels 4 rotating about a horizontal carrying wheel axis L are borne on lateral carrying wheel supports 5, such that there is space for arranging a hoist mechanism 6 inside the carrying wheels for climbing steps. Said hoist mechanism 6 comprises a crank drive 8 operated by a battery-powered drive motor 7, whose crank arm 9 is articulated on a lifting arm 10. Lifting arm 10 comprises a swivel guide component 11 swivel-mounted about a swivel axis S parallel to carrying wheel L and a support component 12 longitudinally displaceable opposite this swivel guide component 11, on which crank arm 9 of crank drive 8 engages and whose free end bears support rollers 13.

Figure 4:
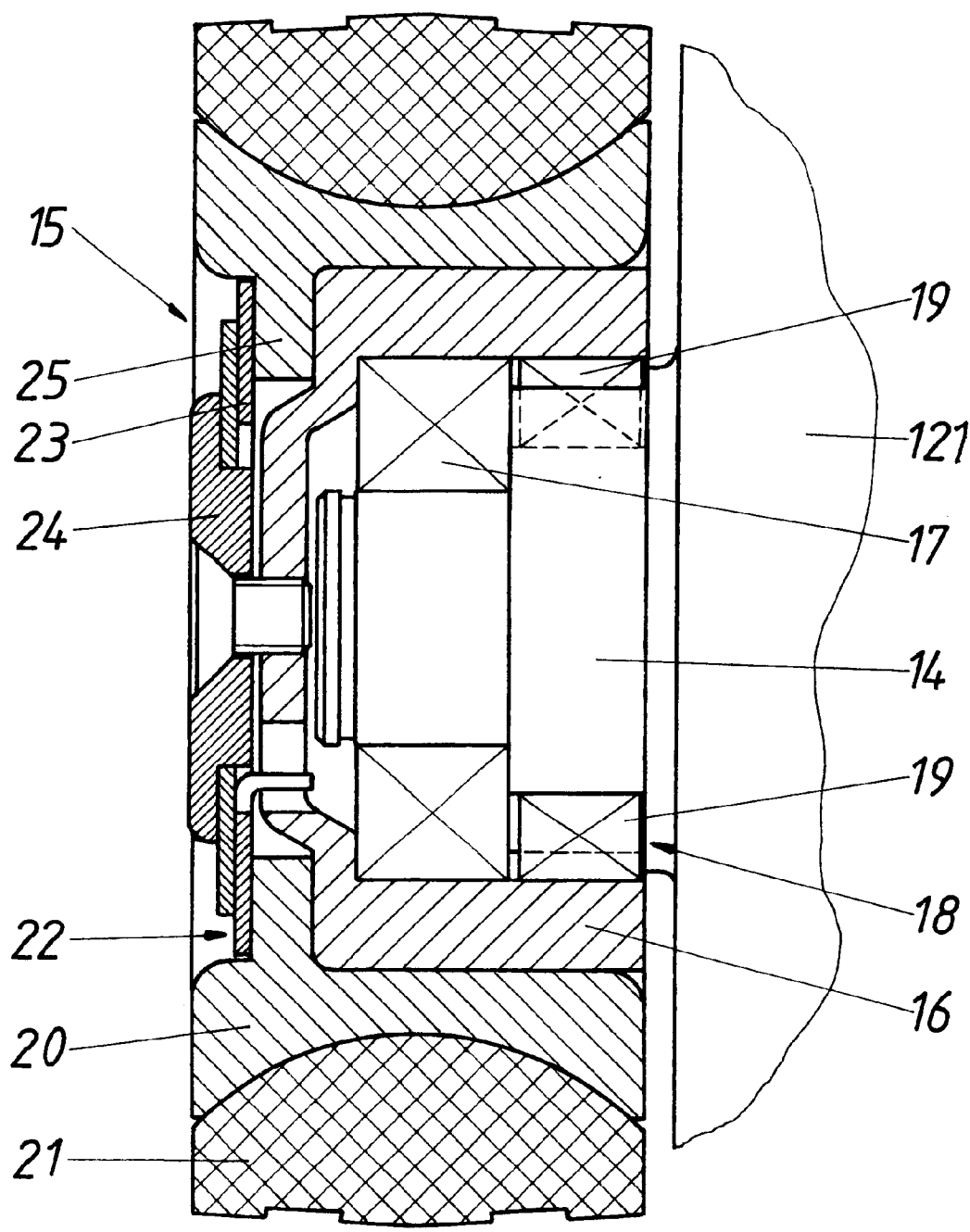
FIG. 4 shows a support roller of the hoist mechanism in axial section on an enlarged scale.

In the illustrated embodiment support component 12 is designed as a bracket and crank drive 8 is articulated on both legs 121, 122 of support component 12 with crank arms 9 arranged in pairs. However, one leg 121 only of support component 12 is guided to be displaced longitudinally on a branch-shaped swivel guide component 11. Support rollers 13 rest in the end region of both bracket legs 121, 122 on axle stubs 14, whereby each support roller 13 is equipped with a combined free-wheel and brake device 15. As illustrated in FIG. 4, a wheel hub 16 is borne on one side by a roller bearing 17 and on the other side by a freewheeling hub 18 on axis stub integral with the support component, such that free-wheeling hub 18 releases wheel hub 16 in one direction of rotation, shown here in the backwards travel direction of the trolley, and in the other direction of rotation it is barred by jamming with axis stub 14. Said free-wheeling hub 18 is fitted as is customary with jamming rollers 19 and accordingly requires no further explanation. A wheel rim 20 with suitable tyre 21 sits on wheel hub 16, which is connected non-positively to wheel hub 16 by means of a brake 22. Brake 22 comprises a brake disc 23 torsional compared to wheel hub 16, which is pressed against an annular stop 25 of wheel rim 20 by means of a spring-loaded tension device 24 with a specific pretension, such that when resulting frictional forces are surmounted relative rotation between wheel rim 20 and brake disc 23 or wheel hub 16 is possible. If support roller 13 is rotated in the locking direction of free-wheeling hub 18, wheel hub 16 blocks opposite axis stub 14 and it now depends on the absorbing torque as to whether wheel rim 20 remains torsional with tyre 21 as compared to wheel hub 16 under the effect of brake 22, or describes a braked rotational motion.

Figure 3:
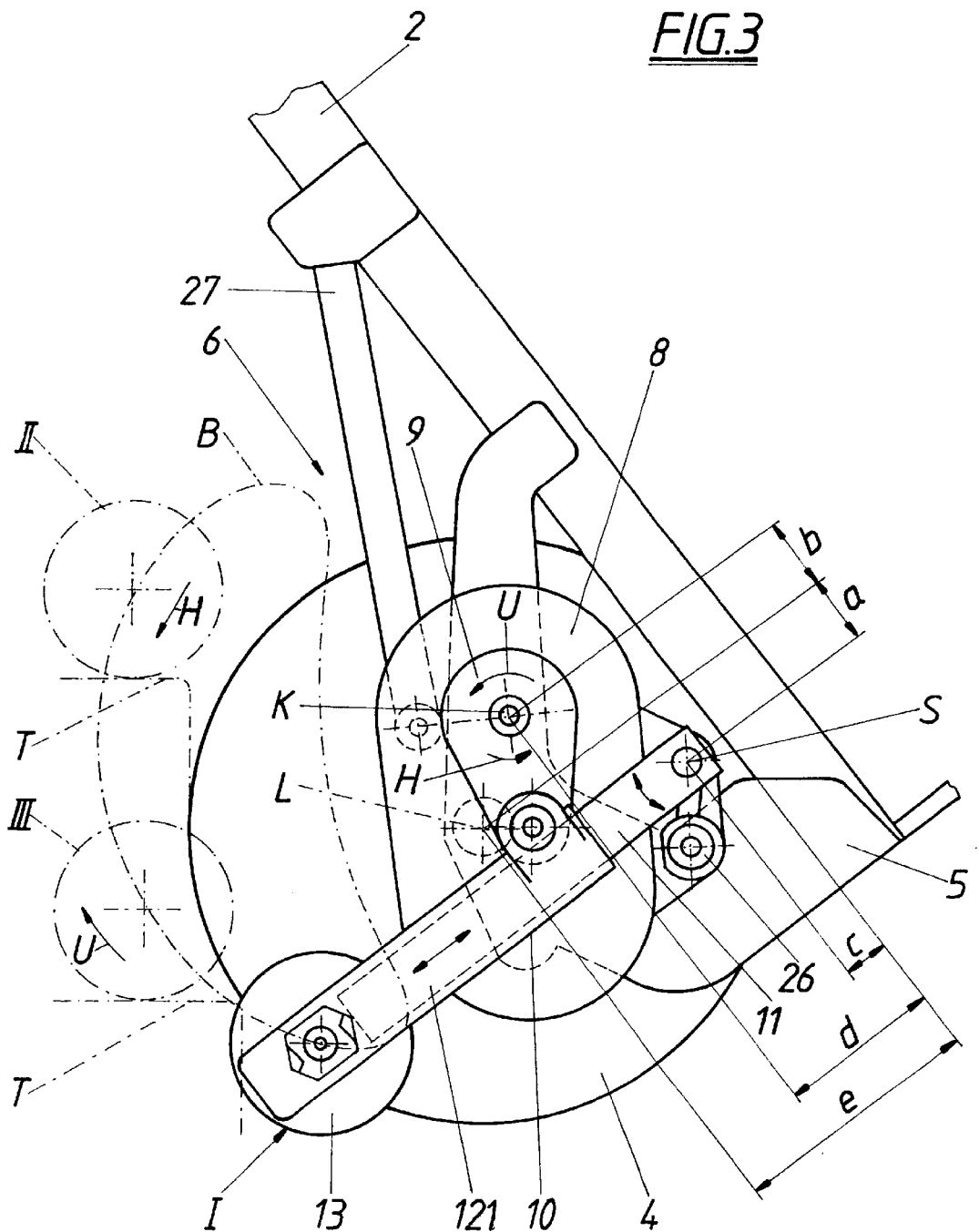
FIG. 3 shows the hoist mechanism of the sack trolley according to the present invention in side view on an enlarged scale with a motion diagram.

As indicated in FIG. 3, the interplay of crank drive 8 on the one hand and lifting arm 10 with support component 12 longitudinally displaceable on the swivel guide component on the other hand gives rise to an upright, substantially reniform path of motion B, for support rollers sitting on the free end of the support component, which moves past support rollers 13 on the return stroke on the step profile when climbing the steps, but which sets down on the respective steps on the working stroke and then raises or lowers sack trolley 1. According to FIG. 3 sack trolley 1 is in its step-travel position, whereby lifting arm 10 is directed in its starting position approximately normally to support frame 2 (position 1). If a step is now ascended by sack trolley 1, it is brought up against the step and crank drive 8 is switched on in the direction of rotation of movement arrow H so that support rollers 13 are first drawn back along curved path B and then moved upwards and finally set down on next highest step T (position 11), by means of which further swivelling of lifting arm 10 raises the entire sack trolley over the step profile to the next highest step tread T. In the process free-wheel brake device 15 of support rollers 13 prevents the support rollers from rolling back down the steps undesirably, though it does allow the trolley to be pulled further up the steps at any time.

When it descends the steps sack trolley 1 is pulled on an upper step T with carrying wheels 4 sufficiently far over the step edge that support rollers 13 set down on step T and by means of the loading switch on the drive of crank drive 8 which moves lifting arm 12 in the direction of motion arrow U (position III). Hoist mechanism 6 thereby lowers sack trolley 1 down from one step to the other, whereby the sack trolley is moved around the step edges on account of path of motion B of support rollers 13. Free-wheel brake device 15 of support rollers 13 also facilitates the backward movement of the sack trolley.

A favourable form and position of path of motion B for support rollers 13 occurs whenever, in the longitudinal direction of support frame 2 swivel axis S with distance a lies below carrying wheel axis L and crank axis K with distance b lies above carrying wheel axis L, and when distance d of crank axis K from support frame 2 is greater than that c of swivel axis S, and distance e of carrying wheel axis L from support frame 2 is greater than that d of crank axis K.

Hoist mechanism 6 together with crank drive 8 and lifting arm 10 is arranged adjustably to influence the relative position of path of motion B, and is for example attached to swivel adjustably by means of a drag bearing 26 and a longitudinally adjustable support strut 27 to support frame 2, such that the path of motion is altered relative to the support frame by means of a swivel adjustment of this assembly unit.

What is claimed is:
1. A sack trolley comprising
   (a) a support frame extending in a longitudinal direction and having an upper end and a lower end,
   (b) hand grip means at the upper end of the support frame,
   (c) a pair of carrying wheels at the lower end of the support frame, the carrying wheels being rotatable about axes extending transversely to the longitudinal direction, and
   (d) a hoist mechanism mounted on the support frame between the carrying wheels for climbing steps, the hoist mechanism comprising
      (1) a lifting arm having one end comprised of a swing guide component which may be swivelled about a swivel axis extending parallel to the axes of the carrying wheels and a support component at a free end opposite to the swing guide component, the support bracket component being longitudinally displaceable relative to the swing guide component and comprising a pair of legs and a support portion extending between the legs transversely to the longitudinal direction,
      (2) support rollers on the support bracket component, and

(3) a crank drive comprising two crank arms linked to the legs of the support bracket component and having a crank axis arranged above the swivel axis of the swing guide component.

2. Sack trolley as claimed in claim 1, wherein the distance of the crank axis from the support frame is greater than the distance of the swivel axis from the support frame, and the distance of the carrying wheel axes from the support frame is grater than the distance of the crank axis from the support frame.

3. Sack trolley as claimed in claim 1, wherein the hoist mechanism including the crank drive and the lifting arm is an assembly unit attached adjustably to the support frame.

4. The sack trolley of claim 1, wherein the crank axis is arranged below the axes of the carrying wheels.

* * * * *